UNITED STATES PATENT OFFICE.

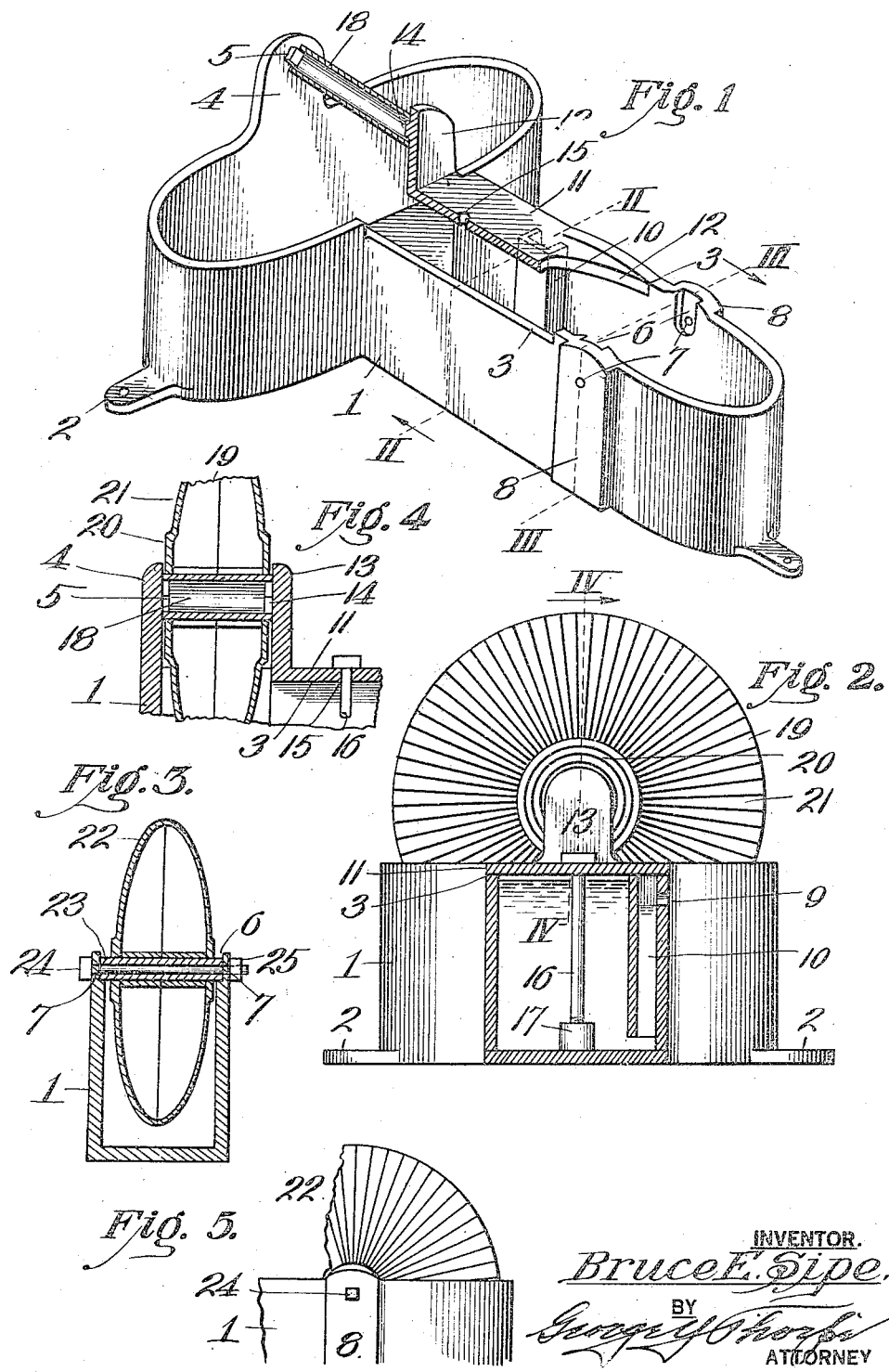

BRUCE E. SIPE, OF HIAWATHA, KANSAS.

HOG-OILER.

1,252,728.  Specification of Letters Patent.  Patented Jan. 8, 1918.

Application filed July 5, 1917. Serial No. 179,058.

*To all whom it may concern:*

Be it known that I, BRUCE E. SIPE, a citizen of the United States, residing at Hiawatha, in the county of Brown and State of Kansas, have invented certain new and useful Improvements in Hog-Oilers, of which the following is a specification.

This invention relates to hog oilers of that class providing a roughened and oil coated surface for hogs to rub against and my object is to produce a device of this character against which a hog can rub and receive an application of oil upon practically any part of his body. A further object is to produce an oiler which will serve several animals simultaneously, and back into which will drain all surplus oil raised through the operation of the oiler by the hogs.

A still further object is to produce a simple, strong, durable and inexpensive oiler, which can be shipped in knock-down condition and easily and quickly set up by an unskilled person.

With these objects in view the invention consists in certain novel and peculiar features of construction and organization of parts as hereinafter described and claimed, and in order that it may be fully understood reference is to be had to the accompanying drawing, in which:

Figure 1, is a perspective view of an oiler with parts omitted and other parts in section.

Fig. 2, is a section of the oiler on the line II—II of Fig. 1, but shows one of the parts omitted from Fig. 1.

Fig. 3, is a section on the line III—III of Fig. 1, but shows in place a part omitted from Fig. 1.

Fig. 4, is a section on the line IV—IV of Fig. 2.

Fig. 5, is a fragmentary side view of the oiler.

In the said drawing, 1 indicates a substantially T-shaped receptacle with the ends of the head portion thereof and the lower end of the stem portion preferably rounded as shown by Fig. 1, and projecting from the ends of the head and the lower end of the stem portion are perforated lugs 2 through which stakes or other securing devices, not shown, may be driven to hold the oiler to the ground or upon a platform, not shown.

The side walls of the stem portion of the receptacle are preferably recessed at their upper edges as at 3 to provide shoulders facing toward the head portion of the receptacle, and the said head portion is provided in line with the stem portion, with an upwardly projecting ear 4 having an inwardly projecting angular lug 5.

Near the ends of recesses 3 most remote from the head portion of the receptacle, the side walls of the stem portion are formed with internal sockets 6 and with bolt holes 7 centrally of the lower ends of said sockets, the side walls being preferably increased in thickness where provided with said sockets by the external ribs 8.

At a suitable height one of the walls of the receptacle is provided with an overflow opening 9 communicating with a vertical passage formed within the receptacle by a vertical partition 10, the said partition terminating short of the bottom of the receptacle, so that a liquid poured in the receptacle shall have access to said passage at the lower end thereof.

11 is a cover bridging the stem portion of the receptacle and fitting on the recessed portions of the walls thereof. At one end the cover bears against the said shoulders, and between said shoulders is recessed or bifurcated as at 12, for a purpose which hereinafter appears.

At its opposite end the cover is provided with an upstanding ear 13 having an angular lug 14 opposite and in alinement with the lug 5. The cover is provided centrally with a bolt hole 15, and to secure the cover firmly in place a bolt 16 extends through said bolt hole and screws into a lug 17 formed on the bottom of the receptacle.

18 is a sleeve bridging the head of the receptacle and fitting at its ends over the lugs 5 and 14, and bearing against the ears 4 and 13 so as to be clamped thereby against rotation, there being sufficient resiliency in said ears to clamp the sleeve firmly in place.

Journaled upon the sleeve 18 is a hollow wheel 19 which depends into the oil in the receptacle, the wheel essentially comprising a pair of similar concave disks having inwardly projecting hubs abutting together endwise, and each disk member is provided preferably with concentric corrugations 20, and with radial corrugations 21. These corrugations provide roughened surfaces upon which a hog may rub and also serve as channels for raising oil from the receptacle as the wheel is turned to apply it to the part of the hog in contact with the wheel, and in this connection it will be noted that the members of the wheel are capable of rotation in opposite directions simultaneously, and that consequently two hogs may conveniently rub upon the said wheel, one standing at one side of the head of the receptacle, and the other perhaps standing crosswise of the stem portion of the receptacle, and in this connection it will be noticed that any surplus oil raised by the wheel will flow back into the receptacle.

A similar smaller wheel 22, is journaled on a sleeve 23 extending across the stem portion of the receptacle and fitting at its ends in the sockets 6, and extending through the perforations 7 and said sleeve, and clamping the same firmly in position is a bolt 24, engaged at one end by a nut 25. In this connection it will be noted by reference to Fig. 3 that the wheel 22 is of elliptic form in cross section and conforms substantially to the rounded end of the stem portion of the receptacle and to the bifurcation 12 in the adjacent end of the cover and it will be understood that the large wheel 19 also approximately conforms to the rounded ends of the head portion of the receptacle. The parts are rounded as explained to make the receptacle as strong as possible and to afford the least possible exposure of the oil to the atmosphere. The form also guards against the entrance of lumps of dirt or mud into the receptacle.

In preparing the oiler for use it is desirable to first charge the receptacle with sufficient water to submerge the lower end of the partition 10. Oil will then be poured into the receptacle, and as its volume increases it will lower the level of the water in the bottom of the receptacle and raise the level of the water in the passage formed by the partition. The parts are so proportioned that before the oil can overflow the sides of the receptacle, water will begin to run out of the overflow opening 9, and when this occurs the charging of the receptacle with oil is completed.

After the quantity of oil has appreciably diminished through the use of the oiler by hogs, the person in charge will replenish the receptacle with oil, and when the same is substantially full attention will be called to the fact by the overflow of water through opening 9. It will thus be seen that a single charge of water will last indefinitely, as practically the only loss outside of the loss by evaporation is that incidental to the filling of the receptacle with oil.

From the above description it will be apparent that I have produced an oiler embodying the features of advantage enumerated as desirable in the statement of the object of the invention, and which is susceptible of changes in form, proportion, detail construction and arrangement of the parts without departing from the spirit and scope of the appended claims.

I claim:

1. A hog-oiler, comprising a T-shaped receptacle, having a pair of shoulders facing the head portion and formed on the sides of the stem portion and with an upstanding ear on the opposite side of the head portion from the stem portion, a cover secured on the stem portion adjacent the head portion and fitting at one end against said shoulders and provided at the opposite end with an upstanding ear; said ears having alined lugs, a sleeve fitting on said lugs and clamped in place between said ears, and a wheel journaled on said sleeve and depending into the head portion of the receptacle.

2. A hog oiler, comprising a fluid receptacle having a rounded end, a cover secured on said receptacle and provided with a concave bifurcation facing the curved end of the receptacle; said receptacle having internal sockets in its opposite walls between said curved end and cover, a sleeve fitting at its ends in said recesses, a bolt extending through said sleeve and the socket walls of the receptacle and clamping the sleeve firmly in place, and a roughened wheel journaled on said sleeve and conforming substantially in cross section to the opening produced by the rounded end of the receptacle and bifurcated end of the cover.

In testimony whereof, I affix my signature.

BRUCE E. SIPE.

Copies of this patent may be obtained for five cents each, by addressing the "Commissioner of Patents, Washington, D. C."